United States Patent
Sato et al.

(10) Patent No.: US 11,601,950 B2
(45) Date of Patent: Mar. 7, 2023

(54) MOBILE STATION APPARATUS AND BASE STATION APPARATUS IN MOBILE COMMUNICATION SYSTEM

(71) Applicants: SHARP KABUSHIKI KAISHA, Sakai (JP); FG Innovation Company Limited, Tuen Mun (HK)

(72) Inventors: Seiji Sato, Sakai (JP); Jungo Goto, Sakai (JP); Osamu Nakamura, Sakai (JP); Shohei Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/764,264

(22) PCT Filed: Nov. 13, 2018

(86) PCT No.: PCT/JP2018/041984
§ 371 (c)(1),
(2) Date: May 14, 2020

(87) PCT Pub. No.: WO2019/098192
PCT Pub. Date: May 23, 2019

(65) Prior Publication Data
US 2020/0396741 A1 Dec. 17, 2020

(30) Foreign Application Priority Data
Nov. 15, 2017 (JP) .............................. JP2017-219907

(51) Int. Cl.
*H04W 72/04* (2009.01)
*H04W 72/14* (2009.01)
(Continued)

(52) U.S. Cl.
CPC ... *H04W 72/0493* (2013.01); *H04W 72/0446* (2013.01); *H04W 72/14* (2013.01); *H04W 76/34* (2018.02); *H04W 80/02* (2013.01)

(58) Field of Classification Search
CPC ......... H04W 72/0493; H04W 72/0446; H04W 72/14; H04W 76/34; H04W 80/02
(Continued)

(56) References Cited

U.S. PATENT DOCUMENTS 10,568,129 B2 * 2/2020 Jeon ................. H04W 72/0446
2015/0124768 A1 5/2015 Jang et al.
(Continued)

OTHER PUBLICATIONS

R2-1711835 (Year: 2017).*
(Continued)

*Primary Examiner* — Intekhaab A Siddiquee
(74) *Attorney, Agent, or Firm* — ScienBiziP, P.C.

(57) ABSTRACT

A state managing unit configured to control a prescribed communication resource allocating process and a reception processing unit configured to receive a control element (CE) are included. The prescribed communication resource allocating process is a process of allocating a communication resource at a predetermined time interval, and the state managing unit suspends an uplink grant configured for the prescribed communication resource allocating process in a case that the reception processing unit receives an SCell Activation/Deactivation MAC CE for deactivating a secondary cell, or an sCellDeactivationTimer configured for the secondary cell expires, and the state managing unit reinitializes the uplink grant suspended, in a case that the reception processing unit receives the SCell Activation/Deactivation MAC CE for activating the secondary cell after the state managing unit suspends the uplink grant.

6 Claims, 5 Drawing Sheets

(51) Int. Cl.
*H04W 80/02* (2009.01)
*H04W 76/34* (2018.01)
*H04W 72/0446* (2023.01)

(58) Field of Classification Search
USPC .......................................................... 370/329
See application file for complete search history.

(56) References Cited

U.S. PATENT DOCUMENTS

2019/0132109 A1* 5/2019 Zhou ................... H04L 5/001
2019/0132862 A1* 5/2019 Jeon ................... H04L 5/0064

OTHER PUBLICATIONS 20190132109P (Year: 2017).*
38321-100.pdf (Year: 2017).*
R2-1709263 (Year: 2017).*
62520379P (Year: 2017).*
62520431P (Year: 2017).*
62520423P (Year: 2017).*
R2-1709271 (Year: 2017).*
R2-1710138 (Year: 2017).*
R2-1710662 (Year: 2017).*
62577540P (Year: 2017).*
R2-1711189 (Year: 2017).*
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage2 (Release 14)", 3GPP TS 36.300 V14.3.0 (Jun. 2017).
Sesssion Chair(Interdigital), "Report from LTE and NR User Plane Break-Out Session", R2-1711835, 3GPP TSG-RAN WG2 Meeting #99bis, Prague, Czech Republic, Oct. 9-13, 2017 p. 1, 35-39.
"3rd Generation Partnership Project; Technical Specification Group Radio Access Network; NR; Medium Access Control(MAC) protocol specification (Release 15)", 3GPP TS 38.321 V1.0.0 (Sep. 2017), p. 27-29.
Interdigital Communications, "Report of e-mail discussion [71#56] Enabling/Disabling of UL functionality", R2-105703, 3GPP TSG-RAN WG2 #71bis, Xian, China, Oct. 11-15, 2010.
3GPP TS 38.321, "3rd Generation Partnership Project; Technical Specification Group Radio Access Network; NR; Medium Access Control (MAC) protocol specification (Release 15)", V15.13.0 (Mar. 2022).

* cited by examiner

| STATE DESIGNATION | UPLINK SPS/GF STATE |
|---|---|
| unconfigured | UNCONFIGURED |
| deactivated | configured uplink grant DEACTIVATED |
| activated | configured uplink grant ACTIVATED |
| suspended | configured uplink grant SUSPENDED |

FIG. 3

MOBILE STATION APPARATUS AND BASE STATION APPARATUS IN MOBILE COMMUNICATION SYSTEM

TECHNICAL FIELD

The present invention relates to a mobile station apparatus and a base station installation in a mobile communication system.

This application claims priority based on JP 2017-219907 filed on Nov. 15, 2017, the contents of which are incorporated herein by reference.

BACKGROUND ART

In a standardization organization of 3rd Generation Partnership Project (3GPP), specifications of Evolved Universal Terrestrial Radio Access (hereinafter referred to as "EUTRA") to which a third-generation mobile communication system has been evolved and Advanced EUTRA (also referred to as "LTE-Advanced") to which EUTRA has further been evolved, have been standardized, and mobile communications using such specifications are commercialized in countries (NPL 1). In recent years, in the 3GPP, Ultra-Reliable and Low Latency Communication (URLLC) for realizing high reliability and low latency has attracted attention as a technology of a 5G mobile communication system.

As one of scheduling (communication resource allocating) technologies, there is a method for periodical allocation of communication resources using Semi-Persistent Scheduling (SPS). Unlike dynamic scheduling in which communication resources are allocated using signaling called a grant for each subframe, this is a technology in which communication resources are allocated at a predetermined time interval to omit a grant, thus enabling efficient communication by decreasing overheads caused by control signals. While such a technology has been employed also in the existing technologies of LTE and LTE-Advanced and used for real-time communications such as a communication of a voice service, studies and standardization of specifications thereof for further evolution of SPS have progressed also in the 5G mobile communication system. In addition, studies and standardization of specifications of an uplink grant-free (GF) communication system have progressed that enables, by applying uplink SPS, uplink data transmission from a mobile station apparatus to a base station apparatus without an uplink grant allocated from the base station apparatus to the mobile station apparatus.

CITATION LIST

Non Patent Literature

NPL 1: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)" 3GPP TS 36.300 V14.3.0 (2017-06)

SUMMARY OF INVENTION

Technical Problem

However, in the existing communication methods using Semi-Persistent Scheduling and uplink grant-free, there is a problem in that a method for controlling activation/deactivation of a serving cell is not defined.

In view of the problem described above, one aspect of the present invention is to provide a communication apparatus including a control unit of uplink grant-free and has Semi-Persistent Scheduling for activation/deactivation of a serving cell.

Solution to Problem (1) An aspect of the present invention is realized for solving the problems described above, and a mobile station apparatus according to one aspect of the present invention is a mobile station apparatus for communicating with a base station apparatus, the mobile station apparatus including: a state managing unit configured to control a prescribed communication resource allocating process; and a reception processing unit configured to receive a control element (CE), wherein the prescribed communication resource allocating process is a process of allocating a communication resource at a predetermined time interval, and the state managing unit suspends an uplink grant configured for the prescribed communication resource allocating process in a case that the reception processing unit receives an SCell Activation/Deactivation MAC CE for deactivating a secondary cell, or an sCellDeactivationTimer configured for the secondary cell expires, and reinitializes the uplink grant suspended, in a case that the reception processing unit receives the SCell Activation/Deactivation MAC CE for activating the secondary cell after the state managing unit suspends the uplink grant.

(2) In addition, a communication method according to one aspect of the present invention is a communication method used for a mobile station apparatus for communicating with a base station apparatus, the communication method including: controlling a prescribed communication resource allocating process; and receiving a control element (CE), wherein the prescribed communication resource allocating process is a process of allocating a communication resource at a predetermined time interval, and an uplink grant configured for the prescribed communication resource allocating process is suspended in a case that an SCell Activation/Deactivation MAC CE for deactivating a secondary cell is received, or an sCellDeactivationTimer configured for the secondary cell expires, and the uplink grant suspended is reinitialized in a case that the SCell Activation/Deactivation MAC CE for activating the secondary cell is received after the uplink grant is suspended.

(3) In addition, a base station apparatus according to one aspect of the present invention is a base station apparatus for communicating with a mobile station apparatus, the base station apparatus including: a resource managing unit configured to control a prescribed communication resource allocating process; and a transmission processing unit configured to transmit a control element (CE), wherein the prescribed communication resource allocating process is a process of allocating a communication resource at a predetermined time interval, and the resource managing unit suspends an uplink grant configured for the prescribed communication resource allocating process in a case that the transmission processing unit transmits an SCell Activation/Deactivation MAC CE for deactivating a secondary cell, or an sCellDeactivationTimer configured for the secondary cell expires, and reinitializes the uplink grant suspended, in a case that the transmission processing unit transmits the SCell Activation/Deactivation MAC CE for activating the secondary cell after the resource managing unit suspends the uplink grant.

(4) In addition, a communication method according to one aspect of the present invention is a communication method used for a base station apparatus for communicating with a terminal apparatus, the communication method including: controlling a prescribed communication resource allocating process; and transmitting a control element (CE), wherein the prescribed communication resource allocating process is a process of allocating a communication resource at a predetermined time interval, and an uplink grant configured for the prescribed communication resource allocating process is suspended in a case that an SCell Activation/Deactivation MAC CE for deactivating a secondary cell is transmitted, or an sCellDeactivationTimer configured for the secondary cell expires, and the uplink grant suspended is reinitialized in a case that the SCell Activation/Deactivation MAC CE for activating the secondary cell is transmitted after the uplink grant is suspended.

Advantageous Effects of Invention

According to one aspect of the present invention, a communication apparatus including a control unit of Semi-Persistent Scheduling for activation/deactivation of a serving cell can be provided.

BRIEF DESCRIPTION OF DRAWINGS

FIG. 3 is a diagram illustrating states of uplink SPS/GF of a mobile station apparatus according to one aspect of the present invention.

DESCRIPTION OF EMBODIMENTS

First Embodiment

Figure 1:
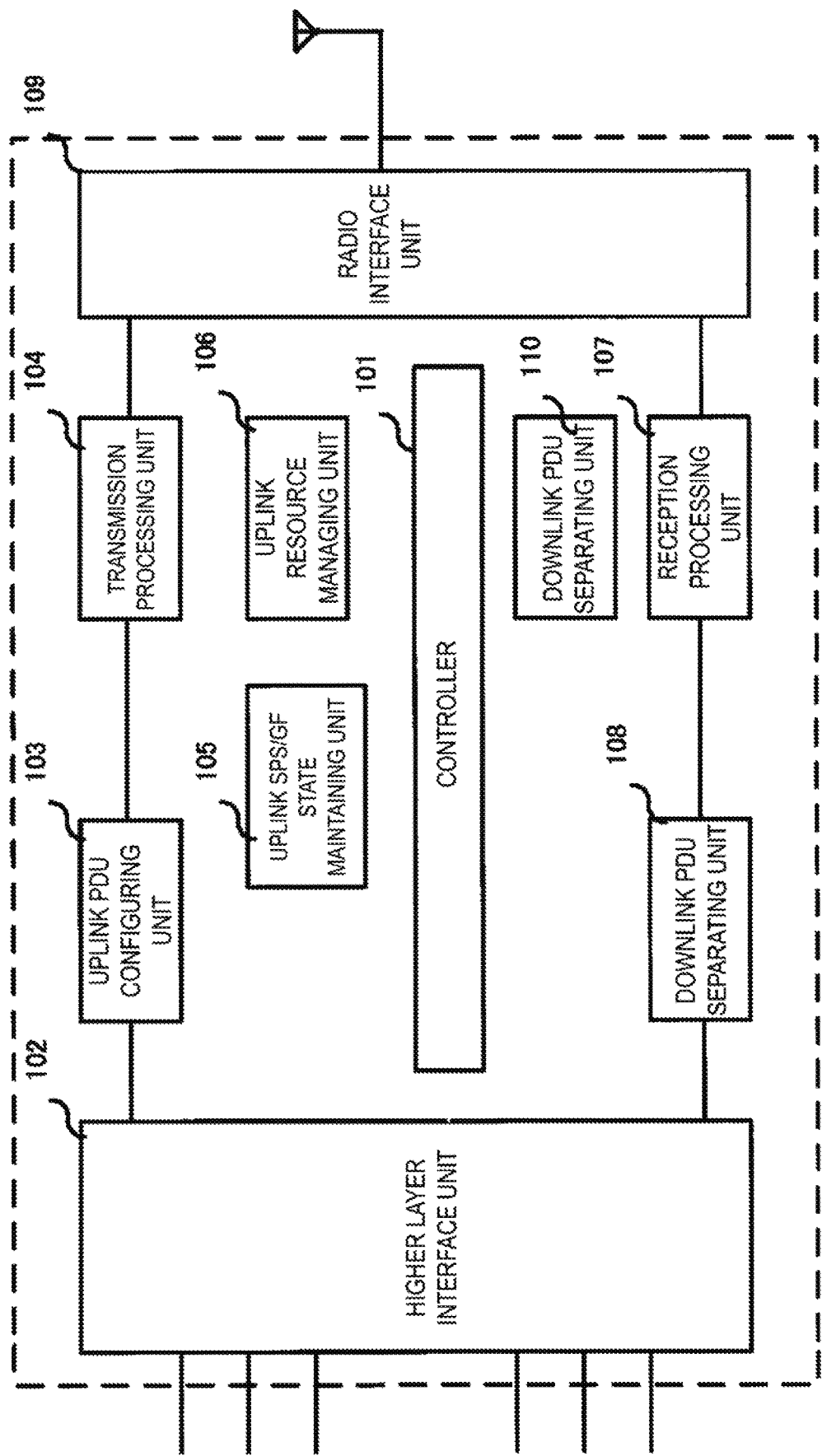
FIG. 1 is a diagram illustrating an example of a MAC entity configuration in a mobile station apparatus according to one aspect of the present invention.

Hereinafter, a first embodiment of the present invention will be described in detail with reference to the drawings. FIG. 1 illustrates an example of a MAC entity configuration in a mobile station apparatus according to this embodiment. In FIG. 1, reference sign 101 represents a controller that controls all the components. Reference sign 102 is a higher layer interface unit, which configures and manages logical channels with higher layers such as PDCP, RLC, and RRC and transmits uplink data and/or receives downlink data through the logical channels. Reference sign 103 represents an uplink Protocol Data Unit (PDU) configuring unit, which configures an uplink PDU by adding a header to uplink transmission data from a higher layer received through a logical channel, combines data of multiple logical channels, and the like. Reference sign 104 represents a transmission processing unit, which performs an error correction coding process, a modulation process, or the like on an uplink PDU generated by the uplink PDU configuring unit 103 and performs mapping to an uplink SPS resource indicated from an uplink resource managing unit 106. Reference sign 105 represents an uplink SPS/GF state managing unit, which manages the states of uplink SPS/GF and changes the states of the uplink SPS/GF in a case that an event relating to the uplink SPS/GF occurs. An uplink resource managing unit 106 manages uplink resources allocated from a base station apparatus and controls mapping between uplink PDUs and transmission resources. In addition, the uplink resource managing unit 106 configures uplink SPS/GF resources and activates/deactivates a configured uplink grant in accordance with the uplink SPS/GF state managed by the uplink SPS/GF state managing unit 105. A reception processing unit 107 reconfigures a downlink PDU by performing demodulation and decoding of an error correction code for a signal received from a radio interface unit 110. A downlink PDU separating unit 108 separates a downlink PDU received from the reception processing unit 107 into one or multiple pieces of data, transmits user data and control data to a higher layer through the higher layer interface unit 102, and transmits control element (CE) data to the controller 101. A reference signal 110 represents a downlink resource managing unit, and the radio interface unit 109 transmits and/or receives radio signals to and/or from a base station apparatus.

Figure 2:
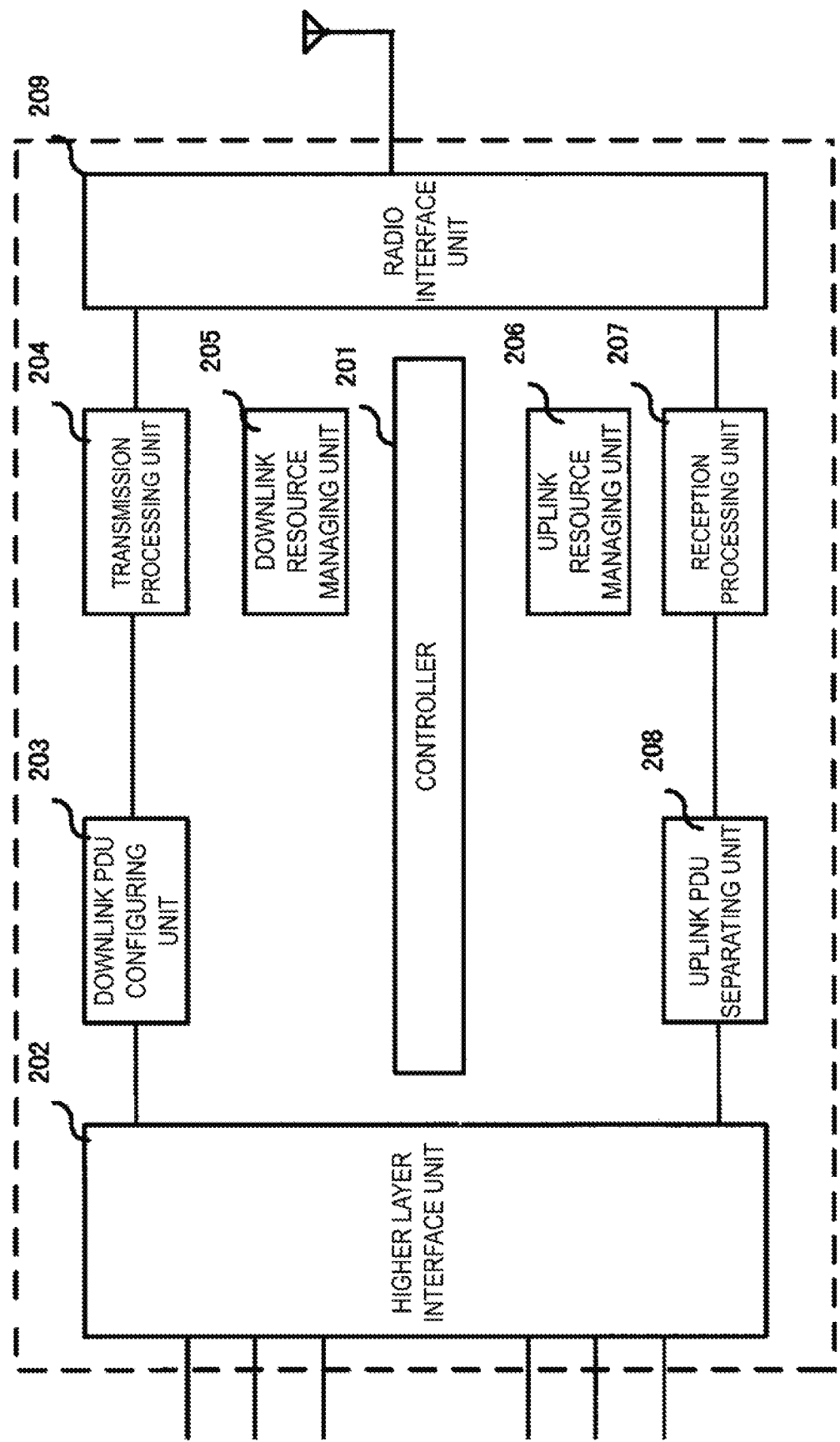
FIG. 2 is a diagram illustrating an example of a configuration of a base station apparatus according to one aspect of the present invention.

FIG. 2 illustrates an example of the configuration of a MAC entity in a base station apparatus according to this embodiment. In FIG. 2, reference sign 201 represents a controller, which controls all the components. Reference sign 202 represents a higher layer interface unit, which configures and manages logical channels with higher layers such as PDCP, RLC, RRC, and the like and transmits uplink data and/or receives downlink data through the logical channels. Reference sign 203 represents a downlink PDU configuring unit, which configures a downlink PDU by adding a header, combining data of multiple logical channels, and the like for downlink transmission data from a higher layer received through a logical channel. Reference sign 204 represents a transmission processing unit, which performs an error correction coding (ECC) process, a modulation process, and mapping to downlink resources in accordance with a downlink resource managing unit 205 for downlink PDUs generated by the downlink PDU configuring unit 203 and transmits a resultant downlink PDU to a mobile station apparatus through a radio interface unit 209. Reference sign 205 represents a downlink resource managing unit, which performs management and scheduling of downlink resources allocated to the mobile station apparatus. An uplink resource managing unit 206 configures and manages uplink resources allocated to the mobile station apparatus. A reception processing unit 207 reconfigures an uplink PDU by performing demodulation and decoding of an error correcting code (ECC) for a signal received from a radio interface unit 210. An uplink PDU separating unit 208 separates an uplink PDU reconfigured by the reception processing unit 207 into one or multiple pieces of data and transmits user data and control data to a higher layer through the higher layer interface unit 202. The radio interface unit 209 transmits and/or receives radio signals to and/or from the mobile station apparatus.

FIG. 3 is a table illustrating states of uplink SPS/GF of the mobile station apparatus, the table being stored in an uplink SPS/GF state storing unit 105. As illustrated in FIG. 3, the uplink SPS/GF is managed to have a maximum of four states. An unconfigured state indicates that the SPS/GF is unconfigured. A deactivated state represents a state in which a configured uplink grant is configured and is deactivated. An activated state represents a state in which a configured uplink grant is activated, and the uplink SPS/GF is transmitted. A suspended state represents a state in which an activated state of the configured uplink grant is suspended, and transmission of the uplink SPS/GF is temporarily stopped.

Figure 4:
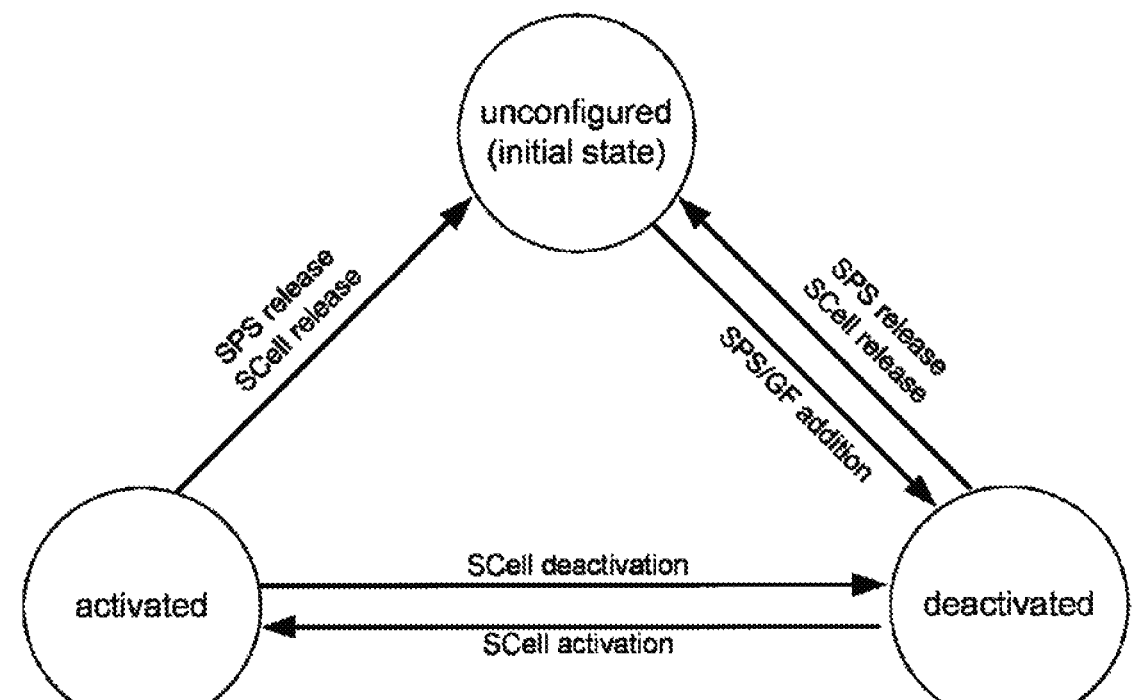
FIG. 4 is a diagram illustrating an example of state transition of uplink SPS/GF of a mobile station apparatus according to one aspect of the present invention.

FIGS. 4(a) and 4(b) illustrate state changes of the uplink SPS/GF in a case that an event relating to the uplink SPS/GF occurs according to this embodiment. FIG. 4(a) is an uplink SPS/GF state transition table, and indicates that in a case that an event relating to the uplink SPS/GF in a leftmost column of FIG. 4(a) occurs in a state of an uppermost row of FIG. 4(a), the uplink SPS/GF state transitions to a state in a cell that corresponds to the column of the state at that time and the row of the event occurring. A cell in which a hyphen is indicated indicates that no state transition occurs. FIG. 4(b) is an uplink SPS/GF state transition diagram graphically illustrating FIG. 4(a). A circle represents a state, and an arrow represents a state change according to an event relating to the uplink SPS/GF. In this embodiment, the suspended state illustrated in FIG. 3 is not used.

Figure 5:
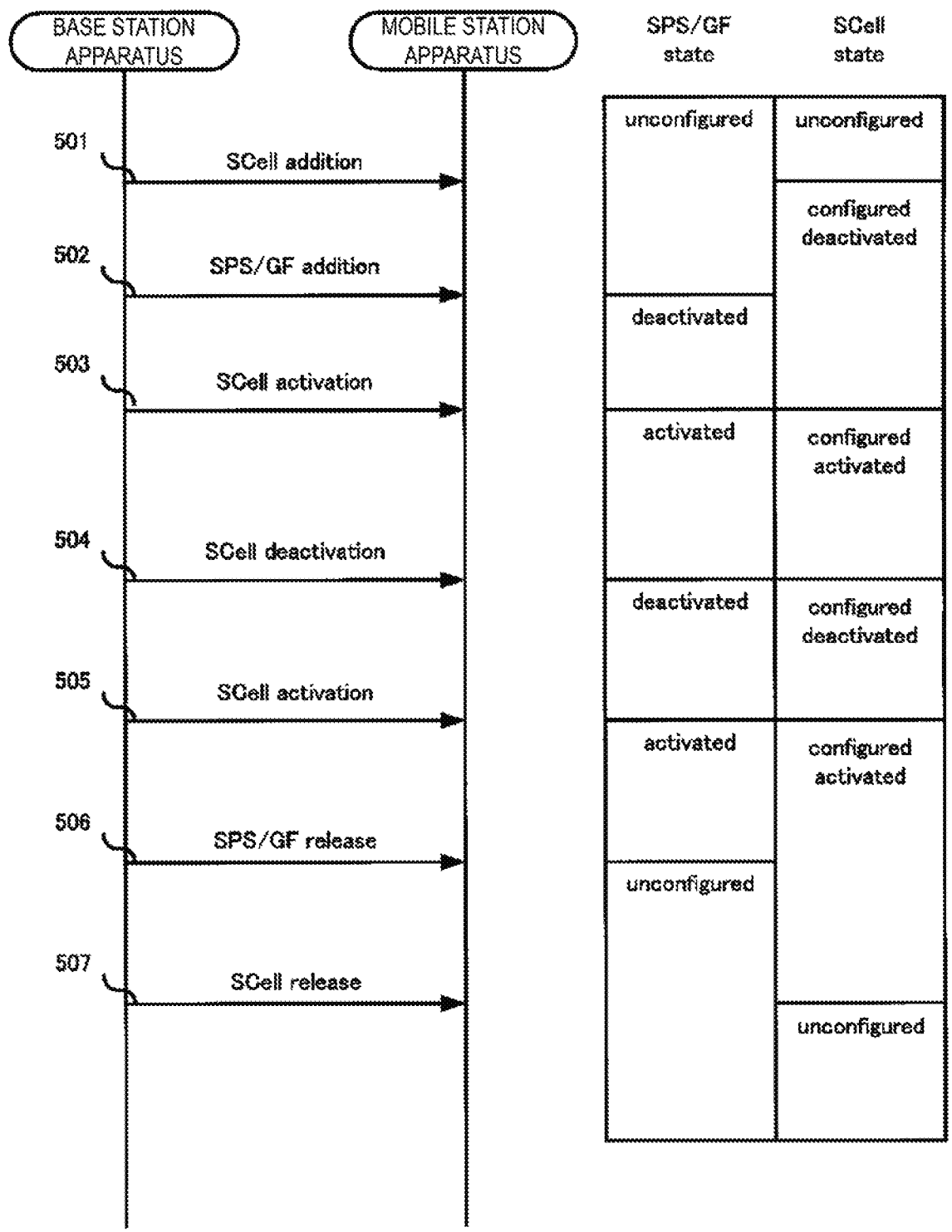
FIG. 5 is a diagram illustrating an example flow of processing by a mobile station apparatus according to one aspect of the present invention.

FIG. 5 is a diagram illustrating a flow of messages between a mobile station apparatus and a base station apparatus and state changes of uplink SPS/GF and a secondary cell (SCell) according to this embodiment. Each message illustrated in FIG. 5 is transmitted from the base station apparatus to the mobile station apparatus, and a response including a processing result for the message is transmitted from the mobile station apparatus to the base station apparatus. Such a response is omitted in FIG. 5. First, as initial states, both the uplink SPS/GF state and the secondary cell state are unconfigured states. Next, a message 501 of SCell addition is transmitted from the base station apparatus to the mobile station apparatus, and the mobile station apparatus configures the SCell according to the content of the message 501. At this time, the state of the SCell is a configured state but is not activated, thus being in a deactivated state (configured but deactivated). Next, a message of SPS/GF addition is transmitted from the base station apparatus to the mobile station apparatus (message 502), and the mobile station apparatus configures an uplink resource and a configured uplink grant to be transmitted with SPS on an UL-SCH of the SCell according to the content of the message 502. However, the SCell is not yet activated and the configured uplink grant is not activated, thus the state of the uplink SPS is deactivated. Next, a message of SCell activation is transmitted from the base station apparatus to the mobile station apparatus (message 503). The mobile station apparatus causes the SCell to be in an activated state (configured and activated) according to the message 503. In addition, the state of the uplink SPS also changes from deactivated to activated, the configured uplink grant is activated, and SPS transmission is performed. Next, a message of SCell deactivation is transmitted from the base station apparatus to the mobile station apparatus (message 504). The mobile station apparatus causes the SCell to be in a deactivated state (configured but deactivated) according to the message 504. In addition, the state of the uplink SPS also changes from activated to deactivated, the configured uplink grant is deactivated, and the SPS transmission is suspended. Next, a message of SCell activation is transmitted from the base station apparatus to the mobile station apparatus again (message 505). The mobile station apparatus causes the SCell to be in the activated state (configured and activated) again according to the message 505. In addition, the state of the uplink SPS changes from deactivated to activated, the configured uplink grant is activated again, and the uplink SPS transmission is performed. Next, a message of SPS release is transmitted from the base station apparatus to the mobile station apparatus (message 506). According to the message 506, the mobile station apparatus suspends the uplink SPS transmission, erases the uplink resource configuration relating to the uplink SPS and the configured uplink grant, and changes the state of the uplink SPS from activated to unconfigured.

As described above, according to the first embodiment of the present invention, the uplink SPS/GF can be appropriately controlled in a case of activation and deactivation of the SCell, thus allowing the uplink SPS/GF transmission on the SCell to be performed.

In the above description, although an example in the case of the uplink SPS transmission has been described, the embodiment is not limited thereto and may be also applied to uplink grant-free (GF) transmission.

Second Embodiment

In the first embodiment, the uplink SPS transmission is controlled by causing the state of the uplink SPS to transition in accordance with the state transition table. In a second embodiment, a method for controlling the uplink SPS without using the state transition table will be described.

A method for controlling uplink SPS by a MAC entity of a mobile station apparatus in a case that the second embodiment of the present invention is applied will be described. In a case that a serving cell has already been activated, or a serving cell is deactivated and an Activation/Deactivation MAC Control Element (CE) for activating the serving cell is received, the MAC entity activates an uplink grant configured for uplink SPS transmission. In addition, after the first transmission of an SPS confirmation MAC CE following the release of an uplink SPS configured for the serving cell, a configured uplink grant configured for the serving cell is deactivated. In addition, after an activation/deactivation MAC CE for deactivating the serving cell is received, or in a case that an sCellDeactivationTimer configured for the serving cell expires, the configured uplink grant configured for the serving cell is deactivated.

As described above, according to the second embodiment of the present invention, the uplink SPS transmission at the time of activating and deactivating the serving cell can be appropriately controlled.

In the above description, although an example in the case of the uplink SPS transmission has been described, the embodiment is not limited thereto and may be also applied to uplink grant-free (GF) transmission.

Third Embodiment

In the second embodiment, a method for controlling the uplink SPS at the time of activating and deactivating the serving cell has been described. The method has a problem in that in a case that the uplink SPS is activated using a physical layer signaling (also referred to as L1 signaling, Downlink Control Information (DCI), or Physical Downlink Control Channel (PDCCH)), the deactivation of the uplink SPS following the deactivation of the serving cell does not allow the uplink SPS to be activated even in a case that the serving cell is activated again. In a third embodiment, a method for solving this problem will be described.

After an activation/deactivation MAC CE for deactivating a serving cell is received, or in a case that an sCellDeactivationTimer configured for the serving cell expires, an MAC entity suspends an uplink grant configured for uplink SPS transmission. In a case that an activation/deactivation MAC CE for activating a serving cell is received during the suspension of the uplink grant configured for the uplink SPS transmission, the configured uplink grant that is suspended is restarted.

As described above, according to this embodiment, even in a case that the uplink SPS is activated using a physical layer signaling, the suspension of the uplink SPS grant following the deactivation of the serving cell allows the configured uplink grant of the uplink SPS to be restarted in a case that the serving cell is activated again.

In the above description, although an example in the case of the uplink SPS transmission has been described, the embodiment is not limited thereto and may be also applied to uplink grant-free (GF) transmission.

Fourth Embodiment

In a fourth embodiment, an example in a case that one aspect of the present invention is applied to downlink SPS reception will be described.

In a case that a certain serving cell is deactivated, a MAC entity of the mobile station apparatus may be configured not to receive a Downlink Shared Channel (DL-SCH) on the serving cell. In such a case, in a resource based on configured downlink assignment, the DL-SCH is not received by the MAC entity of the mobile station apparatus. In addition, in a case that a certain serving cell deactivated, the MAC entity of the mobile station apparatus may be configured not to receive a Physical Downlink Shared Channel (PDSCH) on the serving cell. In such a case, the PDSCH based on the configured downlink assignment is not received by the MAC entity of the mobile station apparatus. In addition, in a case that a serving cell has already been activated, or in a case that a serving cell is deactivated and an Activation/Deactivation MAC control element (CE) for activating the serving cell is received, the MAC entity activates downlink assignment configured for downlink SPS reception on the serving cell. As another example, in a case that the activation/deactivation MAC control element (CE) for activating the serving cell is received, the MAC entity activates the downlink assignment configured for the downlink SPS reception on the serving cell.

As described above, by applying the embodiment, downlink SPS communication at the time of activating and deactivating a serving cell can be appropriately controlled.

In addition, a program used for realizing all or some of the functions of the mobile station apparatus and the base station apparatus described above may be recorded on a computer-readable recording medium, and the processing of each unit may be performed by causing a computer system to read and execute the program recorded on the recording medium. The "computer system" here includes an OS and hardware components such as a peripheral device.

Further, the "computer system" includes an environment for supplying a home page (or environment for display) in a case that a WWW system is utilized.

Furthermore, the "computer-readable recording medium" refers to a portable medium such as a flexible disk, a magneto-optical disk, a ROM, a CD-ROM, and the like, and a storage apparatus such as a hard disk built into the computer system. Moreover, the "computer-readable recording medium" may include a medium, such as a communication line that is used to transmit the program via a network such as the Internet or via a communication line such as a telephone line, that dynamically retains the program for a short period of time, and a medium, such as a volatile memory within the computer system which functions as a server or a client in that case, that retains the program for a fixed period of time. Furthermore, the program may be configured to realize some of the functions described above, and also may be configured to be capable of realizing the functions described above in combination with a program already recorded in the computer system.

Furthermore, all or some of the functions of the mobile station apparatus and the base station apparatus may be realized by aggregating the functions into an integrated circuit. Each functional block may be individually realized as chips, or may be partially or completely integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

The embodiments of the present invention have been described in detail above referring to the drawings, but the specific configuration is not limited to the embodiments and includes, for example, an amendment to a design that falls within the scope that does not depart from the gist of the present invention.

INDUSTRIAL APPLICABILITY

An aspect of the present invention is preferable for use in a wireless communication system and a communication apparatus. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

101 Controller
102 Higher layer interface unit
103 Uplink PDU configuring unit
104 Transmission processing unit
105 Uplink SPS/GF state maintaining unit
106 Uplink resource managing unit
107 Reception processing unit
108 Downlink PDU separating unit
109 Radio interface unit
110 Downlink resource managing unit
201 Controller
202 Higher layer interface unit
203 Downlink PDU configuring unit
204 Transmission processing unit
205 Downlink resource managing unit
206 Uplink resource managing unit
207 Reception processing unit
208 Uplink PDU separating unit
209 Radio interface unit

The invention claimed is:
1. A communication method performed by a mobile station apparatus for communicating with a base station apparatus, the communication method comprising:
receiving a first message to allocate a first set of resources that occur at a first time interval for Uplink Shared Channel (UL-SCH) transmission;

receiving a second message to allocate a second set of resources that occur at a second time interval for the UL-SCH transmission;

receiving a Medium Access Control (MAC) Control Element (CE) after receiving the first message and the second message; and determining whether to start or stop the UL-SCH transmission on the first set of resources and whether to stop the UL-SCH transmission on the second set of resources based on an indication of the MAC CE, wherein:

the UL-SCH transmission on the first set of resources is started when the indication indicates re-initialization of the UL-SCH transmission on the first set of resources, the UL-SCH transmission on the first set of resources is stopped when the indication indicates suspension of the UL-SCH transmission on the first set of resources, and the UL-SCH transmission on the second set of resources is stopped when the indication indicates release of the second set of resources.

2. The communication method of claim 1, wherein the UL-SCH transmission, which has been suspended when the MAC CE is received, on the first set of resources is started when the indication indicates the re-initialization of the UL-SCH transmission on the first set of resources.

3. The communication method of claim 1, wherein the UL-SCH transmission, which has been initialized or re-initialized when the MAC CE is received, on the first set of resources is stopped when the indication indicates the suspension of the UL-SCH transmission on the first set of resources.

4. A mobile station apparatus for communicating with a base station apparatus, the mobile station apparatus comprising:

a memory having computer-readable instructions stored therein; and at least one processor coupled to the memory, the at least one processor being configured to execute the computer-readable instructions to cause the mobile station apparatus to:

receive a first message to allocate a first set of resources that occur at a first time interval for Uplink Shared Channel (UL-SCH) transmission;

receive a second message to allocate a second set of resources that occur at a second time interval for the UL-SCH transmission;

receive a Medium Access Control (MAC) Control Element (CE) after receiving the first message and the second message; and determine whether to start or stop the UL-SCH transmission on the first set of resources and whether to stop the UL-SCH transmission on the second set of resources based on an indication of the MAC CE, wherein:

the UL-SCH transmission on the first set of resources is started when the indication indicates re-initialization of the UL-SCH transmission on the first set of resources, the UL-SCH transmission on the first set of resources is stopped when the indication indicates suspension of the UL-SCH transmission on the first set of resources, and the UL-SCH transmission on the second set of resources is stopped when the indication indicates release of the second set of resources.

5. The mobile station apparatus according to claim 4, wherein the UL-SCH transmission, which has been suspended when the MAC CE is received, on the first set of resources is started when the indication indicates the re-initialization of the UL-SCH transmission on the first set of resources.

6. The mobile station apparatus according to claim 4, wherein the UL-SCH transmission, which has been initialized or re-initialized when the MAC CE is received, on the first set of resources is stopped when the indication indicates the suspension of the UL-SCH transmission on the first set of resources.

* * * * *